United States Patent

Hegner et al.

(10) Patent No.: US 6,422,085 B1
(45) Date of Patent: Jul. 23, 2002

(54) FLUSH-DIAPHRAGM RELATIVE PRESSURE SENSOR

(75) Inventors: Frank Hegner, Lörrach; Andreas Rossberg, Bad Säckingen; Ulfert Drewes, Heitersheim; Elke Schmidt, Schopfheim, all of (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/354,628

(22) Filed: Jul. 16, 1999

Related U.S. Application Data

(60) Provisional application No. 60/103,323, filed on Oct. 7, 1998.

(30) Foreign Application Priority Data

Jul. 21, 1998 (EP) .............................................. 98113587

(51) Int. Cl.[7] .............................................. G01L 7/00
(52) U.S. Cl. ...................................................... 73/706
(58) Field of Search .......................... 73/706, 715, 727, 73/756

(56) References Cited

U.S. PATENT DOCUMENTS 5,079,953 A   1/1992   Martin et al. ................. 73/718
5,747,694 A   5/1998   Baba et al. .................... 73/756

FOREIGN PATENT DOCUMENTS

| DE | 42 44 460 | 12/1992 |
| WO | WO 9634264 | 10/1996 |

*Primary Examiner*—William Oen
(74) *Attorney, Agent, or Firm*—Bose McKinney & Evans LLP

(57) ABSTRACT

In this flush-diaphragm relative pressure sensor (1), the reference air reaches its current dew point before getting into the interior of the housing. The sensor has a capacitive, resistive, or piezoelectric sensing element (2) with a diaphragm (21) an external surface of which comes into direct contact with a medium under pressure. A housing (7) has an interior space (71) and a front portion (72) open across the interior space in the vicinity of which the diaphragm closes the interior space such that the front portion projects beyond the diaphragm. Further, the housing has a bore (721) extending through the front portion from an outer side thereof to the interior space for guiding the reference air. The bore is closed from the outer side with an open-pore, highly heat-conducting and hydrophobic filter (8), so that the filter and the diaphragm are at the same or nearly the same temperature. The filter can be made of a sintered metal, e.g. high-grade steel or bronze, or of a metallic sponge, e.g. titanium or zirconium.

8 Claims, 2 Drawing Sheets

FLUSH-DIAPHRAGM RELATIVE PRESSURE SENSOR

This application claims the binefit of U.S. provisional application No. 60/103,323, filed Oct. 7, 1998.

FIELD OF THE INVENTION

This invention relates to relative pressure sensors. With such sensors, pressures of media, such as liquids, gases or vapors, can be measured, the measurement being made relative to the current atmospheric or ambient pressure, i.e., this atmospheric or ambient pressure serving as a reference pressure.

BACKGROUND OF THE INVENTION

U.S. Pat. No. 5,747,694 discloses a relative pressure sensor comprising a sensing element which is fixed to a glass pedestal and which is connected with a medium under pressure by a bore through the glass pedestal serving to guide reference air, and a housing having an interior space, a pressure connection, a lateral chamber accessible to the reference air, said lateral chamber having a hydrophobic, open-pore filter fitted therein in a plane above the sensing element, sealing the lateral, and a reference air chamber located above the sensing element into which the reference flows from the filter.

Further, U.S. Pat. No. 5,079,953 discloses, as one of three variants, a relative pressure sensor comprising a capacitive sensing element having a diaphragm and a substrate which is connected along an edge with an edge of the diaphragm by a pressure-proof joint to form a chamber, and which has a bore extending there through from an outer side to the chamber for guiding reference air, an external surface of the diaphragm coming into direct contact with a medium under pressure in a measurement operation; and a housing having an interior space, a connecting portion which has a pressure connection formed thereon, and in which the diaphragm is fitted, sealing the interior space, a cover, and a bore extending from a front side of the connecting portion through a wall of the housing and the cover to the interior space for guiding reference air.

Usually, and this is not mentioned in U.S. Pat. No. 5,079,953, the outlet opening of the reference-air bore in the connecting portion, i.e., the front portion is closed with an open-pore, hydrophobic polytetrafluoroethylene filter plug to prevent contaminating particles from getting into the interior of the housing, and thus to the sensing element, to repel splashing and/or condensed water, and to prevent water droplets from being sucked into the interior.

In the assembly disclosed in the U.S. Pat. No. 5,079,053, in contrast to the assembly of U.S. Pat. No. 5,747,694, the out let of the reference air bore is located at a lower level than the diaphragm, so that the reference air has already reached the dew point opf moisture contained in it. Thus, water condensed out of this moisture can flow off to the outside before the reference air gets into the interior of he housing.

That is not the case with the assembly of U.S. Pat. No. 5,747,694, so that despite the hydrophobic filter, moisture-saturated air can reach the sensing element. Also, that U.S. Patent gives no information on the material the filter is made of; therefore, the filter will generally be a polytetrafluoroethylene filter as mentioned above.

When redesigning the relative pressure sensor according to U.S. Pat. No. 5,079,053 to eliminate the need for the pressure connection and allow the medium to come into direct contact with virtually the entire surface of the diaphragm, i.e., when creating a so-called flush-diaphragm relative pressure sensor, it turned out that the polytetrafluoroethylene filter plug and the associated outlet opening have to be disposed laterally in the front portion of the housing, so that the dew point of the reference air is located not outside the interior of the housing, but practically at the sensing element. Consequently, the water vapor will condense in the interior of the housing and at or in the sensing element, and both this element and then the housing will gradually fill up with water.

This is mainly due to the fact that the polytetrafluoroethylene filter plug has a very low thermal conductivity in comparison with the metal of the housing. Thus, reference air saturated with water vapor, which is warmer than the diaphragm, will leak to the interior of the housing without its moisture condensing out at the polytetrafluoroethylene filter plug, even if the front portion of the housing is at the temperature of the current dew point of the reference air.

SUMMARY OF THE INVENTION

It is therefore an object of the invention to provide a flush-diaphragm relative pressure sensor in which the reference air reaches its current dew point before getting into the interior of the housing.

To attain this object, the invention provides a relative pressure sensor comprising a capacitive, resistive, or piezoelectric sensing element having a diaphragm an external surface of which comes into direct contact with a medium under pressure in a measurement operation; and a housing having an interior space, a front portion substantially open across the interior space, in the vicinity of which the diaphragm closes the interior space such that the front portion projects beyond the diaphragm, and a bore extending through the front portion from an outer side thereof to the interior space of the housing for guiding reference air which is closed from the outer side with an open-pore, highly heat-conducting and hydrophobic filter, so that the filter and the diaphragm are at the same or nearly the same temperature.

In a first preferred embodiment of the invention, the filter is made of a sintered metal rendered hydrophobic or of a metallic sponge rendered hydrophobic; the sintered metal is preferably of high-grade steel or bronze, and the metallic sponge is preferably of made of titanium or zirconium.

In a second preferred embodiment of the invention, a capacitive sensing element is provided which comprises in addition to the diaphragm a substrate which is connected along an edge with an edge of the diaphragm by a pressure-proof joint to form a chamber, and through which extends a bore from an outer side to the chamber for guiding reference air, and which capacitive sensing element has an electrode on an inner side of the diaphragm and at least one electrode on an opposite inner side of the substrate, with electrical contact being made to the electrode(s) of the substrate from the outer side of and through the substrate, and electrical contact being made to the electrode of the diaphragm through the joint.

In a third preferred embodiment of the invention, a resistive sensing element is provided wherein a single strain gage or a half-bridge containing two strain gages or a full bridge containing four strain gages is disposed on the diaphragm.

In a fourth preferred embodiment of the invention, a piezoelectric sensing element is provided wherein at least one piezoelectric device is disposed on the diaphragm.

One advantage of the invention is that because of the high thermal conductivity of the filter, the dew point of the reference air is now always located at the filter itself, because it is ensured that the surface temperature of the filter is virtually equal to the temperature of the diaphragm and the medium.

Therefore, the filter, because of its hydrophobic properties cannot become saturated with water, but the water condensed out of the reference air will be drained off to the outside. The temperature in the interior of the housing and in or at the sensing element does not fall below the dew point, so that no condensed water will form in the interior.

BRIEF DESCRIPTION OF THE DRAWINGS

The invention will become more apparent from the following description of embodiments taken in conjunction with the accompanying schematic drawings, in which.

DETAILED DESCRIPTION OF PREFFERRED EMBODIMENTS

Figure 1:
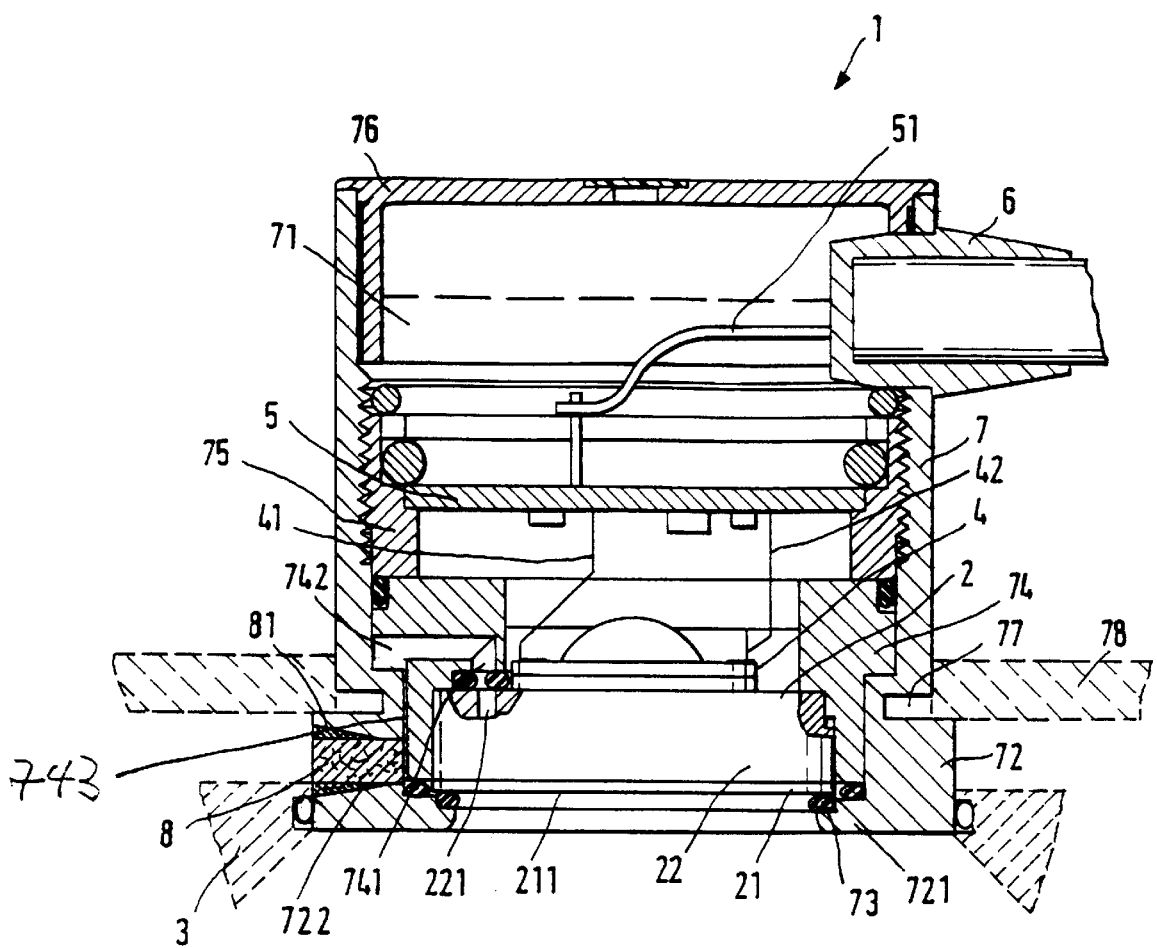
FIG. 1 is a sectional front view of a relative pressure sensor.

Referring to FIG. 1, there is shown a sectional front view of a relative pressure sensor 1, henceforth called a "sensor" for short. Essential parts of the sensor are a sensing element 2 comprising a diaphragm 21, an outer surface 211 of which comes into direct contact with a medium under pressure in a measurement operation. This medium may be stored, for example, in a storage tank 3, of which only a portion is shown in FIG. 1 and in whose wall the sensor 1 is fitted.

In the embodiment of FIG. 1, the sensor 1 is assumed to be a capacitive ceramic sensor, so that the sensing element 2 has a substrate 22 in addition to the diaphragm 21. The substrate 22 is connected along an edge with an edge of the diaphragm 21 by a pressure-proof joint to form a chamber. A bore 221, which serves to guide reference air, extends from an outer side of the substrate 22 through the latter to the chamber.

For the sake of completeness it should be mentioned that an electrode is provided on an inner side of the diaphragm 21 and at least one electrode is provided on an opposite inner side of the substrate 22; these electrodes are not shown in FIG. 1.

Electrical contact to the electrode on the diaphragm 21 is made through the joint, the electrode being connected to ground, for example. Electrical contact to the electrode or electrodes on the substrate 22 is made through the substrate 22, this electrode or these electrodes being connected to an electronic circuit 4 provided on the outer side of the substrate.

This electronic circuit 4 converts the changes in capacitance into, e.g., a correspondingly varying electric voltage which is applied over two leads 41, 42 to a printed circuit board 5 and from there, after further electronic processing if necessary, over a cable 51 to a socket 6.

Instead of the capacitive ceramic sensor shown in the embodiment of FIG. 1, a resistive or piezoelectric sensor can be used. In a resistive sensor, the diaphragm will be provided with strain gages, e.g., a single strain gage or a half-bridge, i.e., two series-connected strain gages, or a full bridge, i.e., four strain gages. In a piezoelectric sensor, at least one piezoelectric device will be provided on the diaphragm.

The sensing element 2 is fitted in a housing 7 having an interior space 71 and a connecting portion, i.e, a front portion 72 which is substantially open across the interior space, and in the vicinity of which the diaphragm 21 closes the interior space 71 such that the front portion 72 projects beyond the diaphragm 21. In FIG. 1, this is achieved by forcing the sensing element 2 from the interior space 71 against a projection 721 of the front portion 72 with the interposition of a seal 73, e.g., an O ring.

In FIG. 1, this forcing of the senwsing element 2 is accomplished by means of a ring 74 which is supported on the substrate 22 and against which presses a threaded ring 75. In the ring 74, a vertical bore 741 begins where the bore 221 in the substrate 22 ends. This vertical bore 741 passes into a horizontal bore 742 ending at the lateral surface of the ring 74.

A bore 722 for guiding reference air extends through the front portion 72 from an outer side thereof to the interior of the housing. This bore 722 communicates with the horizontal bore 742 through a gap between the ring 74 and the housing 7.

The bore 722 is closed from the outer side with an openpore, highly heat-conducting and hydrophobic filter 8. In FIG. 1, the filter 8 is secured in the bore 722 by a thermally conductive adhesive 81. The filter 8 is preferably a sintered metal rendered hydrophobic, particularly high-grade steel or bronze, or a metallic sponge rendered hydrophobic, particularly a titanium or zirconium sponge.

The housing 7 further has a cover 76, so that all of the above-mentioned parts of the sensor which are disposed in the interior space 71 can be introduced into the housing from the side of the cover. Above the bore 722 receiving the filter 8, the housing 7 has an annular groove 77 which serves to provide thermal isolation between the lower and upper portions of the housing, and into which may be fitted a thermally insulating clamping washer 78 (shown only in part).

Figure 2:
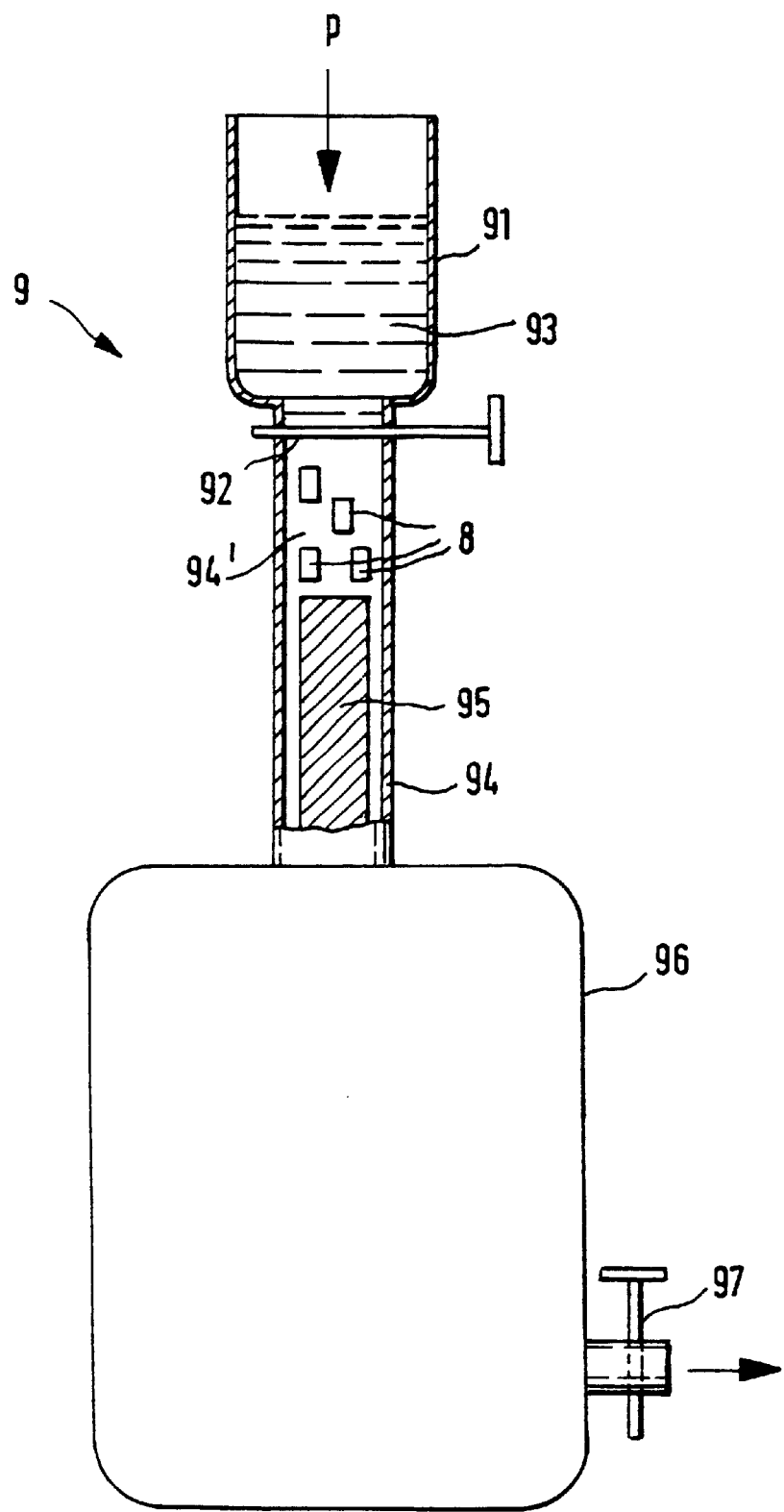
FIG. 2 shows schematically a coating facility in which sintered-metal filters are made hydrophobic.

FIG. 2 shows schematically a coating facility 9 in which filters of sintered metal are made hydrophobic. Such sintered-metal filters of high-grade steel (1.4404) or bronze preferably have a pore diameter of 1 $\mu$m to 10 $\mu$m and are prefabricated with the required dimensions, i.e., length and diameter.

If filters of high-grade steel are used, they will be cleaned before being made hydrophobic to ensure the adherence of the hydrophobic coating to be applied. Since cleaning in a suitable liquid is not possible because of the aforementioned small pore size of the filters—the liquid would clog the pores—, the high-grade steel filters are cleaned in flowing hydrogen. To do this, the filters are heated in a quartz bulb to approximately 1000° C. The hydrogen flows through the quartz bulb under an overpressure of approximately $10^5$ Pa (=1 bar) and is burnt up at the outlet.

The other above-mentioned filter materials mustt be cleaned in a similar manner; if a zirconium sponge is used, the gas in which the sponge is cleaned will be argon, for example, not hydrogen.

After cooling down and being removed from the quartz bulb, the clean filters are put into the coating facility 9. The latter comprises a liquid container 91 which is open to the atmosphere and has a valve 92 at its bottom side. The atmospheric pressure p can thus act on the liquid 93 in the container 91.

The liquid 93 is an impregnant, such as silicone oil, paraffin oil, or a fluorinated siloxane, highly diluted with a solvent, such as carbon tetrachloride. The impregnant and the solvent are preferably mixed in the ratio of approximately 1:20.

Below the valve 92, the clean filters 8 are in a filter-receiving space 94', of a tube 94 above a flow bottleneck 95 for the liquid 93. The tube 94 ends in a collecting tank 96 for the liquid 93, which is connected via a second valve 97 to a vacuum pump (indicated by an arrow).

After the filters have been loaded into the filter-receiving space 94', the valve 92 is closed, the valve 97 is opened, and the vacuum pump is switched on, so that the air in the pores of the filters is removed. After this evacuation, the valve 97 is closed and the valve 92 opened.

As a result, under the action of the atmospheric pressure p, the liquid 93, i.e., impregnant, enters the filter-receiving space 94', covers the filters 8, and is absorbed by the pores of the filters. After the entire amount of impregnant filled into the liquid container 91 has run into the filter-receiving space 94', the valve 97 is opened. The resulting atmospheric pressure in the filter-receiving space 94' causes all pores of the filters 8 to be definitely filled with impregnant.

The impregnated filters are then removed and heated to preferably approximately 200° C. The solvent is thus evaporated and the impregnant is burnt into the surfaces of the pores, so that the latter become hydrophobic.

What is claimed is:

1. A relative pressure sensor comprising:
    a sensing element having a diaphragm with an external surface, wherein said external surface comes into contact with a medium under pressure in a measurement operation; and
    a housing having
        an interior space,
        a front portion, said front portion comprising a section which comes into direct contact with said medium under pressure in said measurement operation;
        an opening, said opening extending from said front portion into said interior space, said opening being closed by said diaphragm; and
        a bore extending from an outer surface of said housing to the interior space of the housing for guiding reference air into said interior space; and
    an open pore hydrophobic filter which closes said bore; wherein said filter is located in the front portion of said housing in good thermal contact to said section of the front portion which comes into direct contact with said medium in said measurement operation, and wherein said filter is highly heatconducting, so that the filter and the diaphragm are at the same or nearly the same temperature.

2. The relative pressure sensor as claimed in claim 1, wherein the filter is made of a sintered metal rendered hydrophobic.

3. The relative pressure sensor as claimed in claim 2, wherein the sintered metal is made of high-grade steel or bronze.

4. The relative pressure sensor as claimed in claim 1, wherein the filter is made of a metallic sponge rendered hydrophobic.

5. The relative pressure sensor as claimed in claim 4 wherein the metallic sponge is of made of titanium or zirconium.

6. The relative pressure sensor as claimed in claim 1, further comprising a capacitive sensing element, said capacitive sensing element comprising a substrate in addition to the diaphragm, and a bore, said substrate being connected along an edge with an edge of the diaphragm by a pressure-proof joint to form a chamber, said bore extending through said substrate from an outer side of said substrate to the chamber for guiding reference air, and said capacitive sensing element having an electrode on an inner side of the diaphragm and at least one electrode on an opposite inner side of the substrate, electrical contact being made to the at least one electrode of the substrate from the outer side of and through the substrate, and electrical contact being made to the electrode of the diaphragm through the joint.

7. The relative pressure sensor as claimed in claim 1, further comprising a resistive sensing element and one of a single strain gauge, a half-bridge containing two strain gauges, and a full bridge containing four strain gauges disposed on the diaphragm.

8. The relative pressure sensor as claimed in claim 1, further comprising a piezoelectric sensing element and at least one piezoelectric device disposed on the diaphragm.

* * * * *